United States Patent
Aoki et al.

(10) Patent No.: US 9,407,924 B2
(45) Date of Patent: Aug. 2, 2016

(54) VIDEO ENCODING DEVICE, VIDEO ENCODING METHOD, AND VIDEO ENCODING PROGRAM

(75) Inventors: Hirofumi Aoki, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 778 days.

(21) Appl. No.: 13/394,061

(22) PCT Filed: Aug. 9, 2010

(86) PCT No.: PCT/JP2010/005001
§ 371 (c)(1),
(2), (4) Date: Jul. 16, 2012

(87) PCT Pub. No.: WO2011/027506
PCT Pub. Date: Mar. 10, 2011

(65) Prior Publication Data
US 2012/0275515 A1    Nov. 1, 2012

(30) Foreign Application Priority Data

Sep. 3, 2009 (JP) ................................. 2009-203420

(51) Int. Cl.
*H04N 7/12* (2006.01)
*H04N 7/26* (2006.01)
(Continued)

(52) U.S. Cl.
CPC .......... *H04N 19/192* (2014.11); *H04N 19/124* (2014.11); *H04N 19/159* (2014.11); *H04N 19/176* (2014.11); *H04N 19/61* (2014.11)

(58) Field of Classification Search
CPC .......... H04N 5/91; H04N 7/133; H04N 7/137
USPC ....................... 348/423; 386/40, 68; 358/339; 375/240.12, 240.13
See application file for complete search history.

(56) References Cited

U.S. PATENT DOCUMENTS

| 5,715,009 A | * | 2/1998 | Tahara et al. ............. 375/240.23 |
| 2002/0118753 A1 | * | 8/2002 | Kawashima ........... H04N 19/61 375/240.13 |

(Continued)

FOREIGN PATENT DOCUMENTS

| CN | 101296322 A | 10/2008 |
| EP | 2475174 A1 | 7/2012 |

(Continued)

OTHER PUBLICATIONS

Communication dated Aug. 27, 2014 from the State Intellectual Property Office of the People's Republic of China in counterpart application No. 201080039552.3.

(Continued)

*Primary Examiner* — Sath V Perungavoor
*Assistant Examiner* — Patricia I Young
(74) *Attorney, Agent, or Firm* — Sughrue Mion, PLLC

(57) ABSTRACT

A video encoding device includes a re-encoding picture type judgment unit which judges whether a picture is to be taken as a reference picture or not in a subsequent re-encoding process. A prediction error generation unit generates a prediction error signal so that only a picture to be a reference picture is formed when an encoded picture is formed. The video encoding device includes a quantization control unit for, when the re-encoding picture type judgment unit judges that the picture is to be taken as a reference picture in the subsequent re-encoding process, controlling so that a quantization step for quantization by a quantization unit is smaller than a case where the picture is judged to be taken as a non-reference picture.

12 Claims, 10 Drawing Sheets

(51) Int. Cl.
  *H04N 5/91* (2006.01)
  *H04N 19/192* (2014.01)
  *H04N 19/159* (2014.01)
  *H04N 19/176* (2014.01)
  *H04N 19/61* (2014.01)
  *H04N 19/124* (2014.01)

(56) References Cited

U.S. PATENT DOCUMENTS

| | | |
|---|---|---|
| 2006/0133674 A1 | 6/2006 | Shibata et al. |
| 2007/0071398 A1* | 3/2007 | Raveendran et al. ........... 386/68 |
| 2009/0028246 A1 | 1/2009 | Miyoshi et al. |

FOREIGN PATENT DOCUMENTS

| | | |
|---|---|---|
| JP | 2002-125232 A | 4/2002 |
| JP | 2005-012249 A | 1/2005 |
| JP | 2007-221411 A | 8/2007 |
| JP | 2008-252755 A | 10/2008 |
| JP | 2009-021908 A | 1/2009 |
| JP | 2009-510930 A | 3/2009 |
| WO | 2004008735 A2 | 1/2004 |

OTHER PUBLICATIONS

Supplementary European Search Report dated Mar. 19, 2013 issued by the European Patent Office in counterpart European Application No. 10813461.0.

* cited by examiner

VIDEO ENCODING DEVICE, VIDEO ENCODING METHOD, AND VIDEO ENCODING PROGRAM

CROSS REFERENCE TO RELATED APPLICATIONS

This application is a National Stage of International Application No. PCT/JP2010/005001, filed on Aug. 9, 2010, which claims priority from Japanese Patent Application No. 2009-203420, filed on Sep. 3, 2009, the contents of all of which are incorporated herein by reference in their entirety.

TECHNICAL FIELD

The present invention relates to a video encoding device, a video encoding method, and a video encoding program each for encoding video data.

BACKGROUND ART

When video data is encoded, encoding methods based on the standards such as MPEG (Moving Picture Experts Group)-2, MPEG-4, and H.264/MPEG-4 AVC (Advanced Video Coding) are used to increase compression efficiency. In those encoding methods, an intra-coded picture (I picture) encoded without prediction from other pictures, or an inter-picture prediction coded picture (P picture or B picture) encoded by use of prediction from a past picture or past and future pictures in image display order relative to a target picture to be encoded can be used. Note that a "picture" corresponds to a field in a case where a video image of an interlace method is encoded per field unit, while it corresponds to a frame in a case of a video image of a non-interlace method (a progressive method). Further, when video data is encoded, two fields can be put together in one frame in a video image of the interlace method to be encoded per frame unit, and in that case, a "picture" corresponds to a frame. Hereinafter, the inter-picture prediction coding may be referred to as inter-coding.

The intra-coded picture is used for encoding of the first picture of a video image, and further is used for the purpose of restoring, to a normal image, a disturbed image which occurs based on a transmission error caused when encoded data of the video image is transmitted, of allowing reproduction of a normal image when a video image is reproduced in the middle thereof, or the like purpose.

An encoding device of a side of transmitting encoded data and a decoding device of a side of receiving encoded data are generally provided with a buffer memory having a suitable capacity for accumulating received encoded data. The buffer memory is called a VBV (Video Buffering Verifier) buffer in MPEG-2 and MPEG-4 part.2 while being called CPB (Coded Picture Buffer) in MPEG-4 AVC. Further, the capacity of a buffer memory is represented as (transmission rate×0.5 seconds), for example. Because the compression efficiency of an intra-coded picture is lower than the compression efficiency of an inter-coded picture, a coding amount of the intra-coded picture is larger than a coding amount of the inter-coded picture. Accordingly, when the intra-coded picture and the inter-coded picture are both included, such a state occurs that the coding amount fluctuates per picture. The buffer memory serves as the role to absorb the influence of the fluctuation in the coding amount.

Further, on the occasion of the use of a B picture, it is demanded that an I picture and a P picture which come later than the B picture in display order should be decoded earlier than the B picture, and accordingly, a sequential order of pictures after encoding is changed with respect to an input order of each image constituting a video image. That is, the reordering of pictures is performed. FIG. 8 is an explanatory view to describe the reordering of pictures. When a video image is input into an encoding device in the order exemplified in FIG. 8(A), the order of pictures in a stream of encoded data to be transmitted is different from the order shown in FIG. 8(A), as exemplified in FIG. 8(B). Note that, in FIGS. 8(A) and (B), "B" indicates a B picture, "I" indicates an I picture, and "P" indicates a P picture. In FIGS. 8(A) and (B), numerals indicate an input order. Further, in FIG. 8(B), a prime mark is attached to I, B, and P, but it is just attached thereto to distinguish differences on data such that I, B, and P in FIG. 8(A) indicate constituents of a video image before encoding, while I, B, and P to which a prime mark is attached in FIG. 8 (B) indicate constituents of a bit stream after encoding.

Transmitted encoded data temporarily stays in a buffer memory, and further, as shown in FIG. 8, pictures are reordered, thereby causing a delay. That is, with respect to a time point when the video image is input into the encoding device, an output time point of a reproduced video image output from a decoding device delays. Hereinafter, encoding which causes intra-coded pictures and inter-coded pictures to be included in an encoded video image may be referred to as usual delay encoding. Note that as delays, there are delays in an encoding process and in a decode process and a delay in a transmission path, too, but the following description focuses on a delay due to encoded data temporarily staying in a buffer memory and a delay due to reordering of pictures.

In the usual delay encoding, there are a reference picture, which is a picture referred to by other pictures in inter-picture prediction, and a non-reference picture, which is a picture that is not referred to by other pictures. A reference picture includes an I picture and a P picture, and a non-reference picture includes a B picture. Note that, in MPEG-4 AVC, a reference structure can be layered and the B picture can be referred to. For example, in regard to a picture group input in order of I0, B1, B2, B3, and P4, when I0 is assumed an I picture, P4 is assumed a P picture, and B1, B2, and B3 are assumed B pictures to perform encoding, such a reference structure can be taken that B2 is taken as a reference picture, B2 refers to two pictures of I0 and P4, B1 refers to two pictures of I0 and B2, and B3 refers to two pictures of B2 and P4. In any case, since the non-reference picture is not referred to by other pictures, an error occurring in the non-reference picture does not propagate in other pictures. However, a decrease in image quality of the reference picture has an influence on other pictures.

In view of this, when usual delay encoding is performed in an encoding device, such control is often performed that a quantization level in a picture to be a non-reference picture is increased to restrain an increase of a coding amount after encoding, and a quantization level in a picture to be a reference picture is decreased to perform control of preventing a decrease in image quality (see, for example, Patent Literature (PTL) 1).

Note that, in FIG. 9, "B" indicates a B picture, "I" indicates an I picture, and "P" indicates a P picture. In FIG. 9, numerals indicate an input order. Further, a picture indicated by an arrow corresponds to a reference picture.

As described above, a delay occurs when usual delay encoding is used, but in a case where bidirectional communication using a video image is implemented or the like, it is preferable to prevent the delay while maintaining moderate compression efficiency. In order to decrease the capacity of the buffer memory, the delay can be restrained by substantially equalizing coding amounts of respective pictures and by restraining the reordering of pictures. In order not to perform the reordering of pictures, the inter-coded picture may not be used, or when the inter-coded picture is used, only one-way prediction may be used.

In order to decrease unevenness in the coding amounts of respective pictures and not to perform the reordering of pictures, as well as to maintain moderate compression efficiency and not to ruin an effect of refresh, it is preferable to use only the intra-coded picture without using the inter-coded picture, in a case where a bandwidth of a transmission path is wide. In the meantime, in a case where the bandwidth of the transmission path is narrow, slice refresh is used, for example. The slice refresh is a technique to refresh a screen while using only the inter-coded picture without using the intra-coded picture. The technique is also called intra slice refresh.

FIG. 10 is an explanatory view showing a state where an image (a screen) is refreshed by an I picture. In FIG. 10, each of areas $R_{j-1}$, $R_j$, and $R_{j+1}$ surrounded by a rectangle of a dashed line shows a prediction allowance range. As shown in FIG. 10, error propagation is limited in the prediction allowance range by restraining reference beyond the prediction allowance range.

FIG. 11 is an explanatory view to describe the slice refresh. The slice refresh does not refresh a whole image (one screen) by the I picture as exemplified in FIG. 10, but performs such refresh as shown in FIG. 11 in which a part of a slice (a set of one or several belt-shaped macroblocks) in a picture is set as an intra-coding region, the slice of the intra coding area in each of consecutive pictures is moved, and when predetermined time passes, the slice of the intra coding area goes through the whole screen (see, for example, PTL 2) In FIG. 11, each of areas $R_{j-2}$, $R_{j-1}$, $R_j$, and $R_{j+1}$ surrounded by a dashed line shows a prediction allowance range. Note that, in the present description and drawings, a subregion constituting an image, such as a "slice," may be expressed as a "segment." Particularly, a target segment (a refreshed area) to be refreshed may be expressed as a "refreshed segment". Further, hereinafter, when the expression a "segment" is used, it refers to either a set of macroblocks having a given shape, which is not limited to the belt-shape, or one macroblock. For example, in a case where the number of macroblocks constituting a picture is n and the refresh is performed so that the intra-coding area goes through the whole screen when N pieces of pictures have passed, a subregion in a given picture constituted by N/n pieces of macroblocks may be used as a refreshed segment. Further, in FIG. 11, an "intra-coding segment" corresponds to a refreshed area. A "ordinary encoding segment" is an area in which intra-coding or inter-coding is used for.

Further, as shown in an explanatory view of FIG. 12, each of prediction allowance ranges corresponding to areas $R_{j-2}$, $R_{j-1}$, $R_j$, and $R_{j+1}$ surrounded by dashed lines are defined, but in each of the prediction allowance ranges, refresh can be performed even in a case where inter-coding can be also used without defining a slice of an intra-coding area.

However, generally, the encoding efficiency is higher when intra-coding is performed in a prediction allowance range, and therefore the refresh by the intra-coding segment exemplified in FIG. 11 is often used. Hereinafter, the refresh exemplified in FIGS. 11 and 12 are referred to as gradual refresh.

In a television broadcast system, as well as a case to provide to audiences video and audio recorded in a storage medium, there is also a case where captured video and obtained audio may be provided to audiences in real time, such as the cases of providing sports programs and news reports. When a shooting location is away from a broadcast station, video and audio are transmitted to the broadcasting station from the shooting location through a plurality of relay stations (see, for example, PTL 3). After that, the video and audio are broadcasted from the broadcasting station to reception equipment which audiences have. Hereinafter, a shooting location may be referred to as a video acquisition spot.

In a case of digital television broadcasting, generally, video data encoded in an imaging device placed at a video acquisition spot is transmitted to a broadcast station. Then, video and audio are transmitted as digital data from the broadcasting station to reception equipment which audiences have. Further, in some cases, received encoded data are decoded in a relay station and then re-encoded to be transmitted to the broadcasting station.

CITATION LIST

Patent Literatures

PTL 1: Japanese Patent Application Laid-Open No. 2002-125232 (paragraph 0007)
PTL 2: Japanese Patent Application Laid-Open No. 2007-221411 (paragraphs 0005, 0006)
PTL 3: Japanese Patent Application Laid-Open No. 2008-252755 (paragraphs 0003 to 0005)

SUMMARY OF INVENTION

Technical Problem

In the television broadcast system, in cases where captured video and obtained audio are provided to the audiences in real time, it is desirable that a delay occurring between the video acquisition spot and the reception equipment which the audiences have be small. However, generally, a bandwidth of a transmission path from the broadcasting station to the reception equipment which the audiences have is not wide. Therefore, in regard to video data transmitted from the broadcasting station to the reception equipment which the audiences have, maintaining of image quality takes precedence over decreasing the delay, and usual delay encoding is used. However, generally, a bandwidth of a transmission path from the video acquisition spot to the broadcasting station is wide. In view of this, in order to decrease an amount of delay from the video acquisition spot to the reception equipment which the audiences have, it is conceivable that the video acquisition spot uses encoding only by intra-coding or uses encoding using gradual refresh.

In a case where usual delay encoding is used for video data transmitted from the broadcasting station to the reception equipment which the audiences have, when the video acquisition spot uses encoding only by intra-coding or encoding using gradual refresh, a data stream including only intra-coded pictures transmitted from the video acquisition spot or a data stream using gradual refresh is decoded once in the broadcasting station and the like, and then re-encode by usual delay encoding.

Hereinafter, an encoding process performed at the video acquisition spot is referred to as a previous encoding process, and re-encoding performed at the broadcasting station and the like is referred to as a subsequent encoding process.

In a video data transmission system in which encoded data of video is transmitted to the reception equipment which the audiences have from the video acquisition spot via the relay station and the broadcasting station, if the subsequent encoding process by usual delay encoding is not taken into consideration in quantization control at the time of performing the previous encoding process, that is, quantization control at the time of performing the encoding process only by intra-coding or the encoding process by use of gradual refresh performed at the video acquisition spot, the same quantization control is performed regardless of whether a picture is to be taken as a reference picture or a non-reference picture in re-encoding.

FIG. 13 is an explanatory view showing an example of a relation between a data stream (see FIG. 13 (A)) of encoded data by the previous encoding process and a data stream (see FIG. 13 (B)) of encoded data re-encoded at the subsequent stage. It is assumed that usual delay encoding is performed in the subsequent encoding process, and, in the usual delay encoding, such control is performed that a quantization level in a non-reference picture is increased while a quantization level in a reference picture is decreased (see FIG. 13(B)). In FIG. 13, "B" indicates a B picture, "I" indicates an I picture, and "P" indicates a P picture. Further, in FIG. 13(B), an I picture and a P picture respectively indicated by "I" and "P" drawn large indicate pictures quantized with a relatively small quantization level. Further, in FIG. 13(A), it is assumed that a quantization level of each P picture is the same.

In the subsequent re-encoding process, in a case where re-encoding is performed after encoded data formed in the previous encoding process has been decoded, even if such control is performed that the quantization level in the reference picture is decreased, an effect to restrain degradation in image quality may be decreased. This is because, as shown in FIG. 13(A), image quality of all pictures has been degraded to some extent in the previous encoding process in which all pictures are changed to P pictures by use of a uniform quantization level.

FIG. 14 is an explanatory view showing an example of a relation between a data stream (see FIG. 14(A)) of encoded data in a case where gradual refresh is performed in the previous encoding process and a data stream (see FIG. 14 (B)) of encoded data which is re-encoded at the subsequent stage. In FIG. 14, "B" indicates a B picture, "I" indicates an I picture, and "P" indicates a P picture. An area shown with slanted lines in FIG. 14(A) is a refreshed area. Further, in FIG. 14(B), an I picture and a P picture respectively indicated by "I" and "P" drawn large indicate pictures quantized with a relatively small quantization level.

In the subsequent re-encoding process, generally, such control is performed that a quantization level in a picture to be a picture (a non-reference picture) which is not a reference picture is increased so as to restrain an increase in coding amount after encoding while a quantization level in a picture to be a reference picture is decreased. In view of this, when gradual refresh in the previous encoding process is performed without taking into consideration the control of the quantization level in the subsequent re-encoding process, the quantization level of a picture to be taken as a non-reference picture in the subsequent re-encoding process is relatively larger than the quantization level in the previous encoding process, and a coding amount assigned to the picture in the previous encoding process might be wasted. That is, in the whole video data transmission system, encoding efficiency might decrease. In other words, image quality obtained by the same coding amount might decreases, or a coding amount to obtain the same image quality might increase.

In view of this, an object of the present invention is to provide a video encoding device, a video encoding method, and a video encoding program each of which can improve encoding efficiency in a whole video data transmission system in a case where re-encoding is performed in a device for receiving encoded data through a transmission path.

Solution to Problem

A video encoding device according to the present invention includes: prediction error generation means for generating a prediction error signal from image data and a predicted value generated by an inter-prediction part or an intra-prediction part; quantization means for quantizing the prediction error signal generated by the prediction error generation means; and re-encoding picture type judgment means for judging whether a picture is to be taken as a reference picture or not in a subsequent re-encoding process, wherein the prediction error generation means generates the prediction error signal so that only a picture to be a reference picture is formed when the encoded picture is formed, and the encoding device includes quantization control means for, when the re-encoding picture type judgment means judges that the picture is to be taken as a reference picture in the subsequent re-encoding process, controlling so that a quantization step for quantization by the quantization means is smaller than a case where the picture is judged to be taken as a non-reference picture.

A video encoding device according to another aspect of the present invention is a video encoding device for intra-coding image data in an input video image to form an encoded picture, and includes: prediction error generation means for generating a prediction error signal from image data and a predicted value generated by an intra-prediction part; quantization means for quantizing the prediction error signal generated by the prediction error generation means; re-encoding picture type judgment means for judging whether a picture is to be taken as a reference picture or not in a subsequent re-encoding process; and quantization control means for, when the re-encoding picture type judgment means judges that the picture is to be taken as a reference picture in the subsequent re-encoding process, controlling so that a quantization step for quantization by the quantization means is smaller than a case where the picture is judged to be taken as a non-reference picture.

A video encoding method according to the present invention includes: generating a prediction error signal from image data and a predicted value generated by an inter-prediction process or an intra-prediction process; quantizing the prediction error signal thus generated; judging whether a picture is to be taken as a reference picture or not in a subsequent re-encoding process; generating a prediction error signal so that only a picture to be a reference picture is formed when an encoded picture is formed; and controlling, when the picture is judged to be taken as a reference picture in the subsequent re-encoding process, so that a quantization step for quantization is smaller than a case where the picture is judged to be taken as a non-reference picture.

A video encoding program according to the present invention is to cause a computer to execute the following processes: a process of generating a prediction error signal from image data and a predicted value generated by an inter-prediction process or an intra-prediction process; a process of quantizing the prediction error signal thus generated; a process of judging whether a picture is to be taken as a reference picture or not in a subsequent re-encoding process; a process of generating a prediction error signal so that only a picture to be a reference picture is formed when an encoded picture is formed; and a process of controlling, when the picture is judged to be taken as a reference picture in the subsequent re-encoding process, so that a quantization step for quantization is smaller than a case where the picture is judged to be taken as a non-reference picture.

Advantageous Effects of Invention

According to the present invention, in a case where re-encoding is performed in a device for receiving encoded data through a transmission path, encoding efficiency can be improved in a whole video data transmission system.

DESCRIPTION OF EMBODIMENTS

Exemplary Embodiment 1

Figure 1:
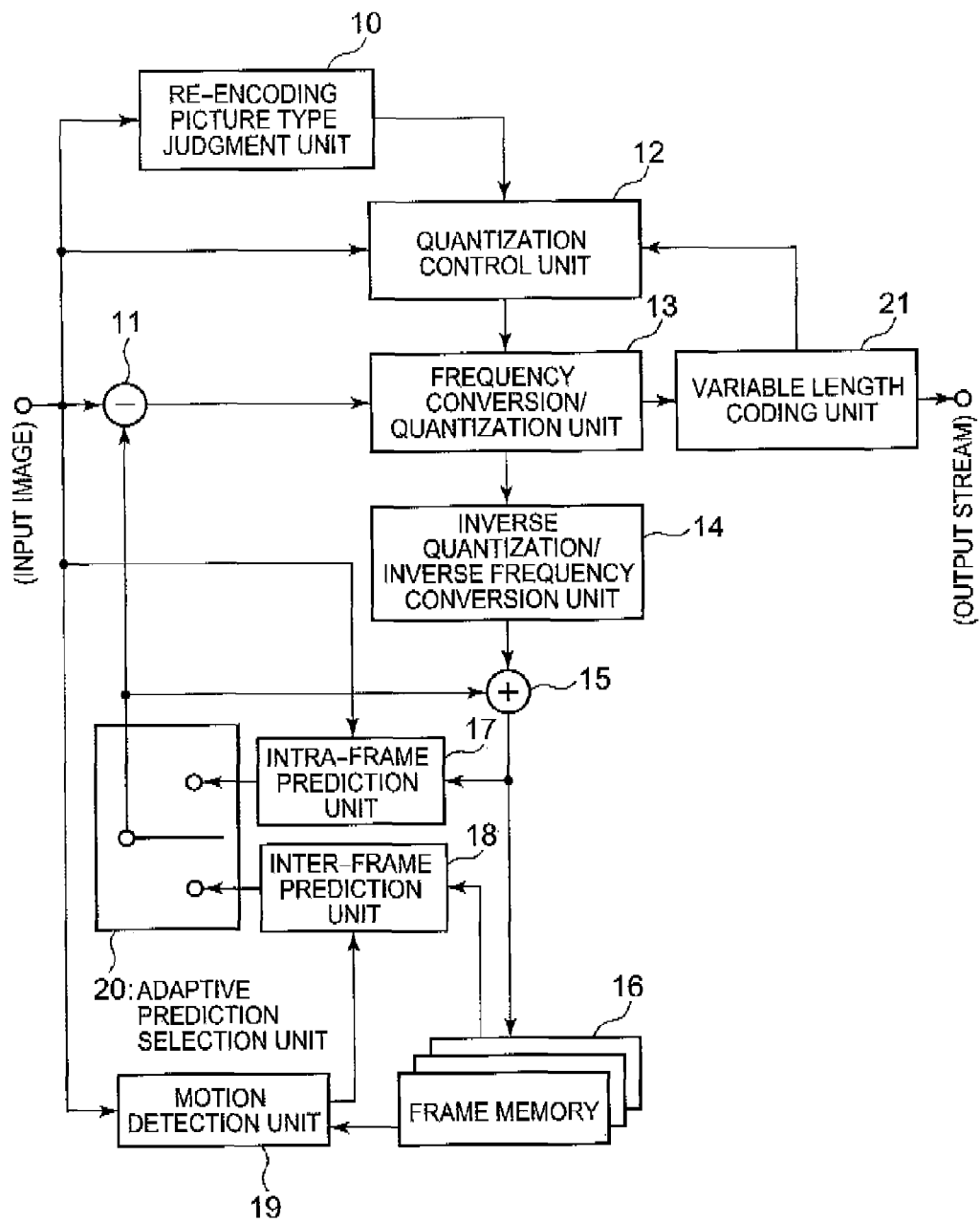
FIG. 1 is a block diagram showing a first exemplary embodiment of a video encoding device according to the present invention.

FIG. 1 is a block diagram showing a first exemplary embodiment of a video encoding device according to the present invention. In the video encoding device shown in FIG. 1, each input image constituting an input video image is input into a subtracter 11, a quantization control unit 12, and a motion detection unit 19. Hereinafter, as a picture, a frame is taken as an example. The subtracter 11 generates a prediction error signal per macroblock unit in the input image. The macroblock is a subregion into which the input image is divided, and is typically a rectangular area with 16×16 pixels. The subtracter 11 generates a prediction error signal by subtracting, from data of a macroblock, a predicted value output from an intra-frame prediction unit (an intra-prediction unit) 17 or an inter-frame prediction unit (an inter-prediction unit) 18. Hereinafter, the video encoding device is referred to as an encoding device.

The quantization control unit 12 determines a quantization parameter based on the input image and an generated coding amount, and outputs the quantization parameter thus determined. The quantization parameter includes a concept of a quantization step size or a quantization level.

A frequency conversion part in a frequency conversion/quantization unit 13 performs discrete cosine transform (DCT) on the prediction error signal generated by the subtracter 11 so as to convert the prediction error signal from a signal of a spatial region to a signal of a frequency region, thereby forming a DCT coefficient. A quantization part in the frequency conversion/quantization unit 13 quantizes the DCT coefficient formed by the frequency conversion part with a quantization level determined by a quantization control unit 12. A variable length coding unit 21 performs variable length coding the DCT coefficient thus quantized, and outputs it as a stream of encoded data.

An inverse quantization part in an inverse quantization/inverse frequency conversion unit 14 inversely quantizes the DCT coefficient output from the frequency conversion/quantization unit 13. An inverse frequency conversion part in the inverse quantization/inverse frequency conversion unit 14 performs inverse DCT on the DCT coefficient thus inversely quantized to reproduce the prediction error signal of the spatial region.

An adder 15 adds the prediction error signal output from the inverse quantization/inverse frequency conversion unit 14 and the predicted value output from the intra-frame prediction unit 17 or the inter-frame prediction unit 18 to reproduce an image frame, and stores the image frame thus reproduced in a frame memory 16 as a reference frame.

The motion detection unit 19 detects a motion vector that minimizes the prediction error signal of the macroblock of the input image from a reference frame stored in the frame memory 16, and outputs it to the inter-frame prediction unit 18.

An adaptive prediction selection unit 20 is a switch to select an output of the intra-frame prediction unit 17 or an output of the inter-frame prediction unit 18 as a signal to be output to the subtracter 11. The adaptive prediction selection unit 20 selects the output of the intra-frame prediction unit 17 when intra-coding is performed, while selecting the output of the inter-frame prediction unit 18 when inter-coding is performed.

Note that the encoding device shown in FIG. 1 can be implemented by a hardware circuit, but it can be also implemented by a processor for executing a process based on a program. On this account, the process in the encoding device described below can be implemented by software.

Further, a feature of the present exemplary embodiment is that a re-encoding picture type judgment unit 10 for forming a control signal to be fed to a quantization control unit 12 based on an input image is provided.

Further, in the present exemplary embodiment, the inter-frame prediction unit 10 performs only an encoding process in which a past picture relative to a target picture to be encoded in image display order is taken as a reference picture, and does not perform an encoding process using prediction from past and future pictures relative to the target picture to be encoded. That is, the encoding device performs an encoding process using only one-direction prediction in a case where the encoding process is performed with the use of inter-frame prediction. More specifically, the encoding device outputs only P pictures. Note that in the present exemplary embodiment, the encoding device may be configured to perform an encoding process without using inter-frame prediction. In the case where the encoding device is configured as such, the encoding device outputs only I pictures. Further, in that case, the encoding device does not need to include constituents related to the inter-frame prediction.

Figure 2:
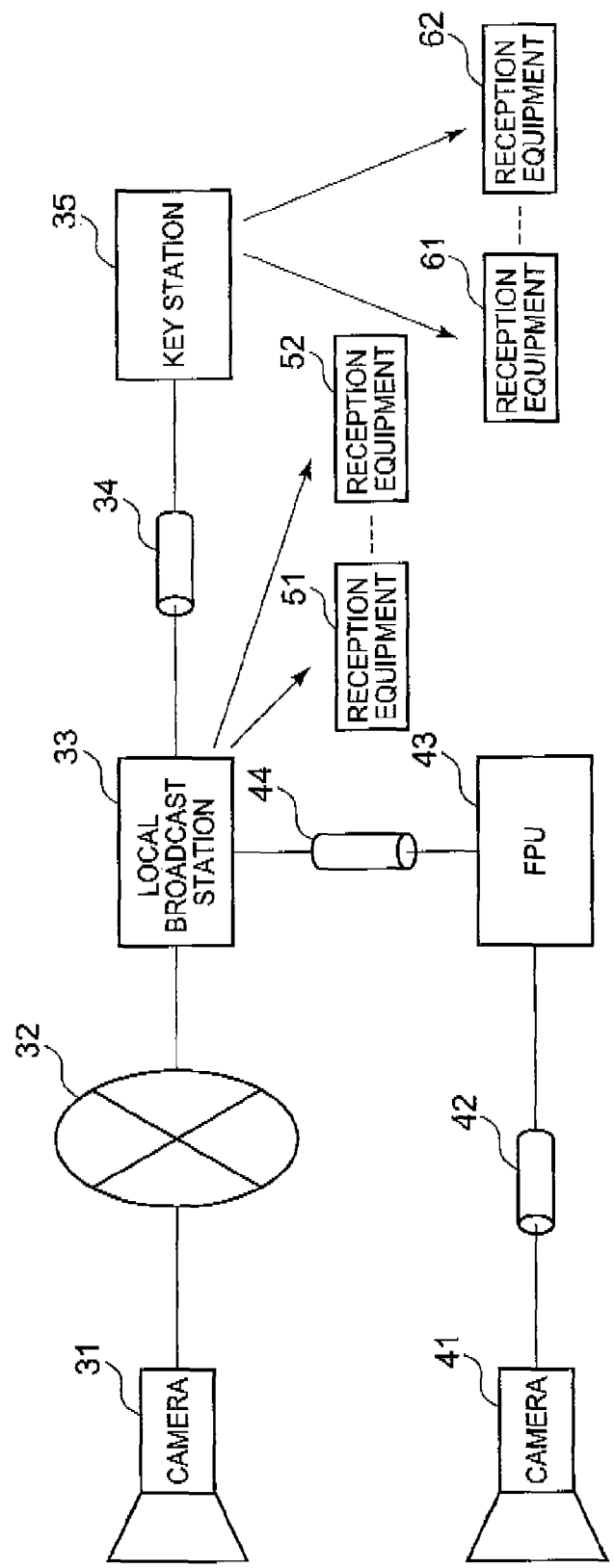
FIG. 2 is a block diagram showing an example of a video data transmission system to which an encoding device according to the present invention can be applied.

FIG. 2 is a block diagram showing an example of a video data transmission system to which the encoding device according to the present invention can be applied. In the system shown in FIG. 2, a stream of encoded data based on a video image captured by a camera 31 placed in a video acquisition spot is transmitted to a local broadcast station 33 through a communication network 32. The communication network 32 is, for example, an IP network including a radio transmission path. A broadcasting facility (not shown) in the local broadcast station 33 and a broadcasting facility (not shown) in a key station 35 communicate with each other through a transmission path 34.

Further, a stream of encoded data based on a video image captured by a camera 41 carried by a field pickup van (not shown), for example, is transmitted through a microwave link 42 to an FPU (field Pickup Unit) 43 which is a radio-relay device in a relay point. A plurality of relay points may exist in some cases. Then, the stream is transmitted from the FPU 43 to the local broadcast station 33 through a transmission path 44.

In the local broadcast station 33, broadcasting (digital broadcasting) with digital signals using the stream of encoded data is performed by its broadcasting facility with respect to reception equipment (for example, television receivers) 51 and 52 of audiences. Further, in the key station 35, the digital broadcasting using the stream of encoded data is performed by its broadcasting facility with respect to reception equipment 61 and 62 of audiences.

Transmission paths from the cameras 31 and 41 to the local broadcast station 33 have relatively large bandwidths. Further, the transmission path between the local broadcast station 33 and the key station 35 also has a relatively large bandwidth. On this account, in a case where encoded data of a video image is transmitted to those transmission paths, encoding only by intra-coding or encoding using gradual refresh is often used.

However, transmission paths between the local broadcast station 33 and the reception equipment 51 and 52 and transmission paths between the key station 35 and the reception equipment 61 and 62 do not have so wide bandwidths. Further, in the digital broadcasting, it is demanded that encoding be performed based on a predetermined standard. Accordingly, the local broadcast station 33 and the key station 35 perform, for example, digital broadcasting by use of encoded data obtained by usual delay encoding. In a case where a video image obtained by the camera 31 or 41 is distributed to the audiences immediately, the local broadcast station 33 and the key station 35 decode data based on encoding only by intra-coding or encoding using gradual refresh, and subsequently, perform re-encoding by usual delay encoding.

Note that the system shown in FIG. 2 is an example, and the system to which the encoding device according to the present invention can be applied is not limited to the system shown in FIG. 2.

Further, in the system exemplified in FIG. 2, the cameras 31 and 41 placed at the video acquisition spots are equipped with the encoding device exemplified in FIG. 1.

Figure 13:
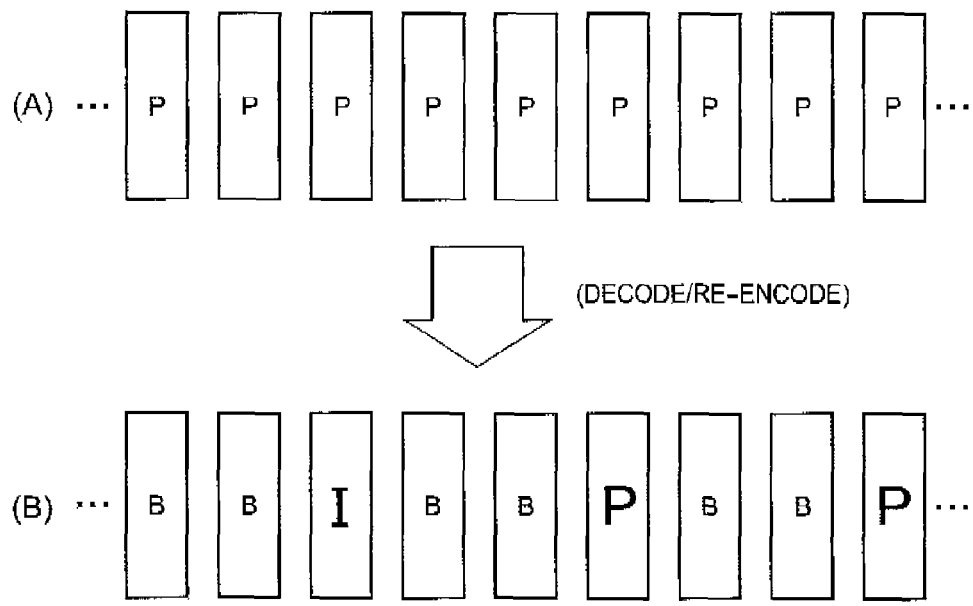
FIG. 13 is an explanatory view showing an example of a relation between a stream of encoded data and a stream of encoded data re-encoded at a subsequent stage.

In a case where re-encoding by usual delay encoding is performed in the local broadcast station 33 and the key station 35, it is assumed that such control (see FIG. 13(B)) is performed that a quantization level in a picture to be a non-reference picture is increased while a quantization level in a picture to be a reference picture is decreased. Hereinafter, a spot where re-encoding is performed is referred to as a re-encoding spot.

In the meantime, from the viewpoint that the increase in the coding amount is permissible to some extent because the bandwidth of the transmission path is large, it is assumed that the encoding device at a video acquisition spot performs encoding only by use of picture types that can be a reference picture (an I picture and a P picture).

The encoding device at a video acquisition spot estimates a picture to be a reference picture in re-encoding performed at a re-encoding spot, and decreases a quantization level for encoding the picture estimated to be a reference picture so as to be smaller than a quantization level for encoding a picture estimated not to be a reference picture. In a case where such control is not performed, such a situation may occur that with respect to a picture of which a quantization level is to be decreased in re-encoding at a re-encoding spot, a rough quantization level is used in encoding at the video acquisition spot. With respect to the picture for which a rough quantization level is used in encoding at the video acquisition spot, even if the quantization level is decreased in re-encoding, the prevention of degradation in image quality cannot be expected. However, in the present exemplary embodiment, the quantization level of the picture estimated to be a reference picture in re-encoding at a re-encoding spot is decreased at the video acquisition spot, thereby making it possible to prevent the degradation in image quality. In other words, encoding efficiency in the whole system from the video acquisition spot to the reception equipment of audiences is improved.

Figure 3:
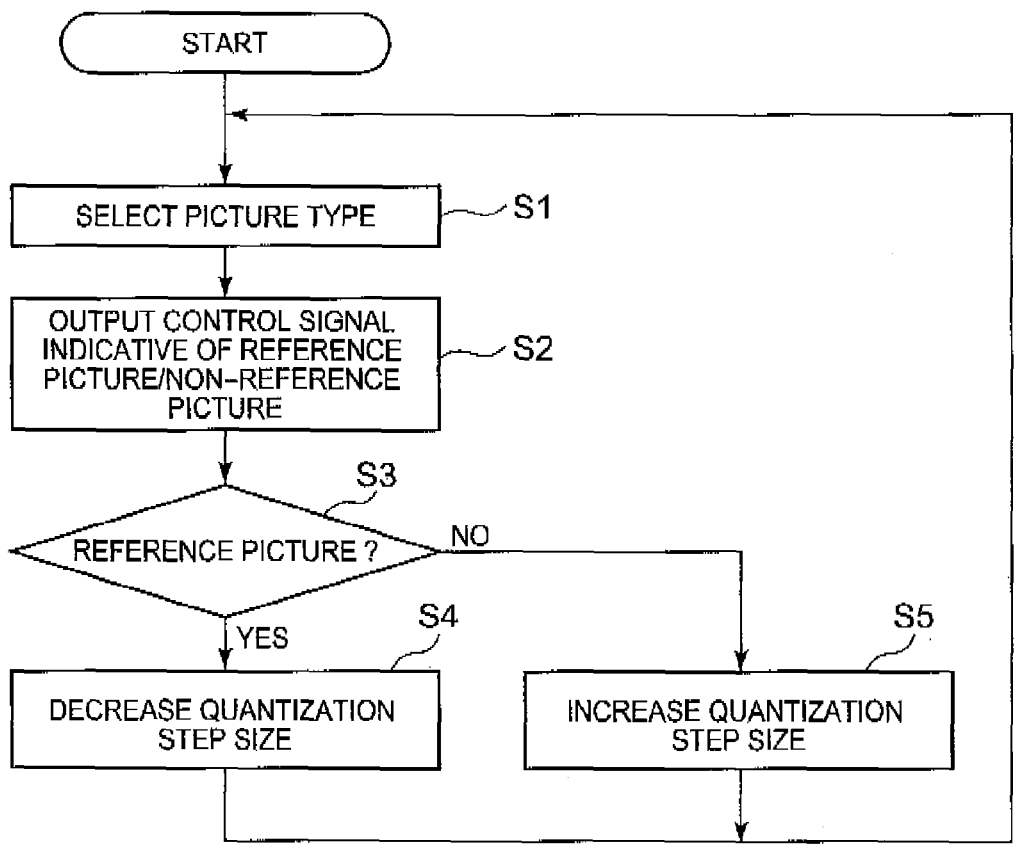
FIG. 3 is a flowchart showing the behavior of an encoding device.

The following describes the behavior of the encoding device with reference to a flowchart of FIG. 3.

The re-encoding picture type judgment unit 10 selects a picture type considered to be selected in the subsequent re-encoding with respect to each picture (a frame in the present exemplary embodiment) constituting input video data (Step S1). As a method of selecting a picture type, any well-known method may be used, but the re-encoding picture type judgment unit 10 uses the following method as an example.

In a case where an average quantization level in pictures when each of the pictures is encoded is represented as Q and a generated coding amount is represented as S, a feature amount X (=S×Q) represented by (S×Q) is assumed a complexity. In a case where a complexity of latest encoding as an I picture is represented as $X_I$ and a complexity of latest encoding as a P picture is represented as $X_p$, when the following expression:

$$(X_p/X_I) > T$$

is satisfied with respect to a threshold value T defined by a bit rate, a distance between reference pictures is assumed "1." Otherwise, the distance between reference pictures is assumed "3."

The distance between reference pictures is a time distance between a picture that can be a reference picture and a picture that can be a reference picture subsequently. When the distance between reference pictures is "1", a picture just after the picture that can be a reference picture is also taken as a picture that can be a reference picture. When the distance between reference pictures is "3", a picture which is the third picture coming after the picture that can be a reference picture is taken as a picture that can be a reference picture.

The re-encoding picture type judgment unit 10 outputs a control signal indicative of a picture type to the quantization control unit 12 with respect to each picture constituting the input video data (Step S2).

When the control signal indicates a reference picture, the quantization control unit 12 decreases a quantization step size as compared with a case where the control signal does not indicate a reference picture (Steps S3 and S4). In other words, the quantization level is decreased. When the control signal does not indicate a reference picture, that is, when the control signal indicates a non-reference picture, the quantization control unit 12 increases the quantization step size as compared with the case where the control signal indicates a reference picture (Steps S3 and S5). In other words, the quantization level is increased.

Note that when the control signal from the re-encoding picture type judgment unit 10 indicates a reference picture, a corresponding picture is taken as a reference picture in re-encoding performed by a subsequent device communicably connected to the encoding device exemplified in FIG. 1 through a transmission path. When the control signal from the re-encoding picture type judgment unit 10 indicates a non-reference picture, a corresponding picture is taken as a non-reference picture in re-encoding performed by a subsequent device communicably connected to the encoding device exemplified in FIG. 1 through a transmission path.

Further, in the present exemplary embodiment, the quantization control unit 12 changes the quantization level depending on whether the control signal from the re-encoding picture type judgment unit 10 indicates a non-reference picture or a reference picture, but the encoding device changes all encoding types of pictures to be actually encoded into the I picture or the P picture. When all the encoding types of the pictures to be actually encoded are changed to the I picture, the adaptive prediction selection unit 20 always selects the output of the intra-frame prediction unit 17. In the meantime, when all the encoding types of the pictures to be actually encoded are changed to the P picture, the adaptive prediction selection unit 20 selects either the output of the intra-frame prediction unit 17 or the output of the inter-frame prediction unit 18, but the inter-frame prediction unit 18 outputs a predicted value using only one-direction prediction.

Figure 4:
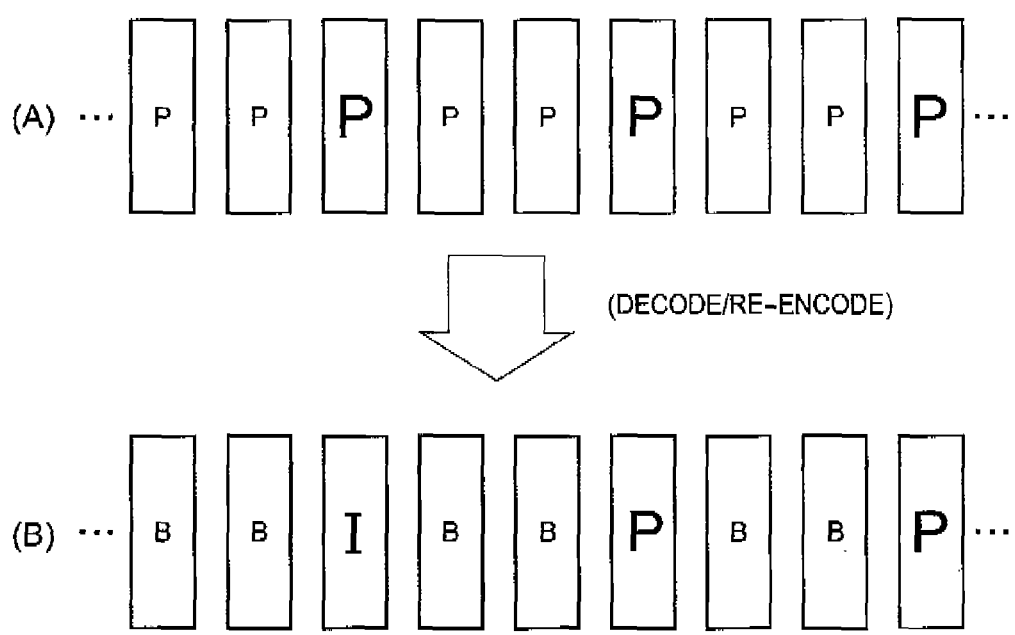
FIG. 4 is an explanatory view showing an example of a relation between a stream of encoded data and a stream of encoded data re-encoded at a subsequent stage.

FIG. 4 is an explanatory view showing an example of a relation between a stream of encoded data according to the encoding device exemplified in FIG. 1 and a stream of encoded data re-encoded at a subsequent stage. In FIG. 4(A), it is exemplified that the encoding device transmits a data stream constituted by only P pictures. In FIG. 4(A), "P" indicates a P picture, but a P picture indicated by "P" drawn large indicates a picture quantized with a relatively small quantization level.

As shown in FIG. 4(B), a subsequent device for re-encoding sets a picture quantized with a small quantization level by the encoding device to a reference picture (an I picture or a P picture).

Note that as a method in which the subsequent device specifies a picture quantized with a small quantization level by the encoding device, that is, a method in which the subsequent device specifies a picture estimated to be a reference picture by the encoding device, there are the following methods, for example.

As described above, in a case where the encoding device judges whether a picture is to be a reference picture or a non-reference picture based on a complexity X of an image, the subsequent device determines whether the picture is to be a reference picture or a non-reference picture based on the complexity X of the image according to the same algorithm as an algorithm used by the encoding device for judgment. In that case, the encoding device does not need to transmit, to the subsequent device, information to specify a picture quantized with a small quantization level.

Alternatively, the subsequent device may detect an average quantization step of each picture by referring to a plurality of past and future pictures relative to the each picture, so as to sort the each picture into a group where the average quantization step is large or a group where the average quantization step is small. In that case, pictures belonging to the group where the average quantization step is small are changed to reference pictures, and pictures belonging to the group where the average quantization step is large are changed to non-reference pictures. Even when such control is performed, the encoding device does not need to transmit, to the subsequent device, information to specify a picture quantized with a small quantization level.

Further, the encoding device may transmit supplemental information to specify a picture quantized with a small quantization level, together with encoded data. For example, in MPEG-2 and MPEG-4 part.2, supplemental information is set in an area of user_data. In MPEG-4 AVC, supplemental information is set in an SEI (Supplemental Enhancement Information) message. Further, it is also possible to set supplemental information in a system layer, for example, areas of MPEG-2 TS (Transport Stream) and MPEG-2 PS (Program Stream).

Note that in the present exemplary embodiment, the encoding device judges whether a picture is to be a reference picture or a non-reference picture depending on a complexity of an image, but may handle all pictures as reference pictures.

Exemplary Embodiment 2

Figure 5:
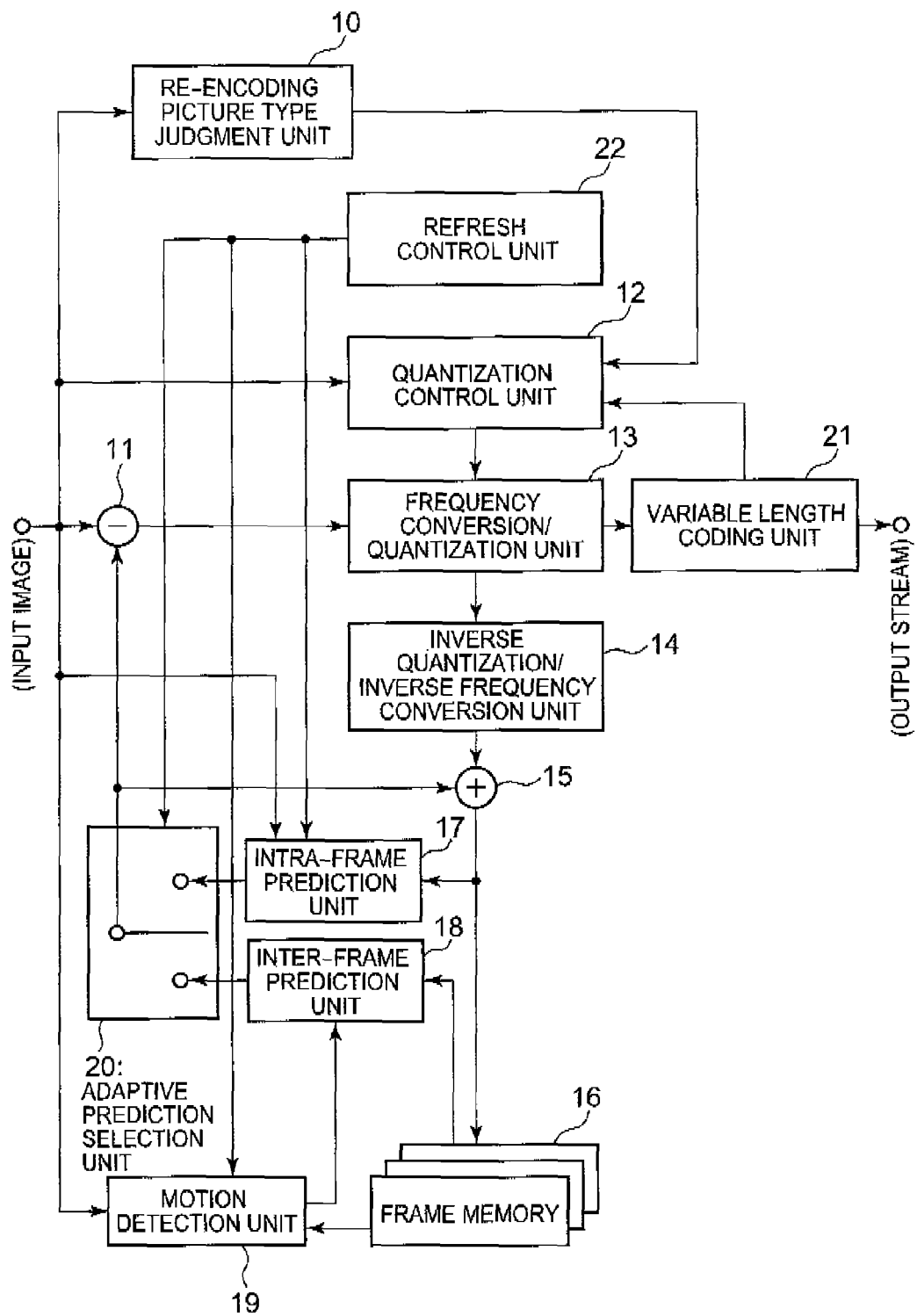
FIG. 5 is a block diagram showing an exemplary configuration of an encoding device of a second exemplary embodiment.

In the first exemplary embodiment, a configuration about a refresh control is omitted, but the encoding device may perform a predetermined refresh control. FIG. 5 is a block diagram showing an exemplary configuration of an encoding device according to a second exemplary embodiment which performs a refresh control.

The encoding device exemplified in FIG. 5 includes a refresh control unit 22. The refresh control unit 22 performs a process of setting a refreshed area (a refreshed unit area) in each frame. Then, the refresh control unit 22 supplies a refresh control signal for refresh to an intra-frame prediction unit 17 and a motion detection unit 19. The refresh control signal is a signal indicative of the refresh area. Note that the refresh control signal may include information indicative of a prediction allowance range.

When the refresh control signal is input, an adaptive prediction selection unit 20 selects only an output of the intra-frame prediction unit 17. That is, refresh is performed by intra-coding.

Note that if it is set not to perform reference beyond a prediction allowance range, inter-coding may be used in a refreshed segment. In that case, the adaptive prediction selection unit 20 selects an output of the inter-frame prediction unit 18 when the refresh control signal is input.

Figure 11:
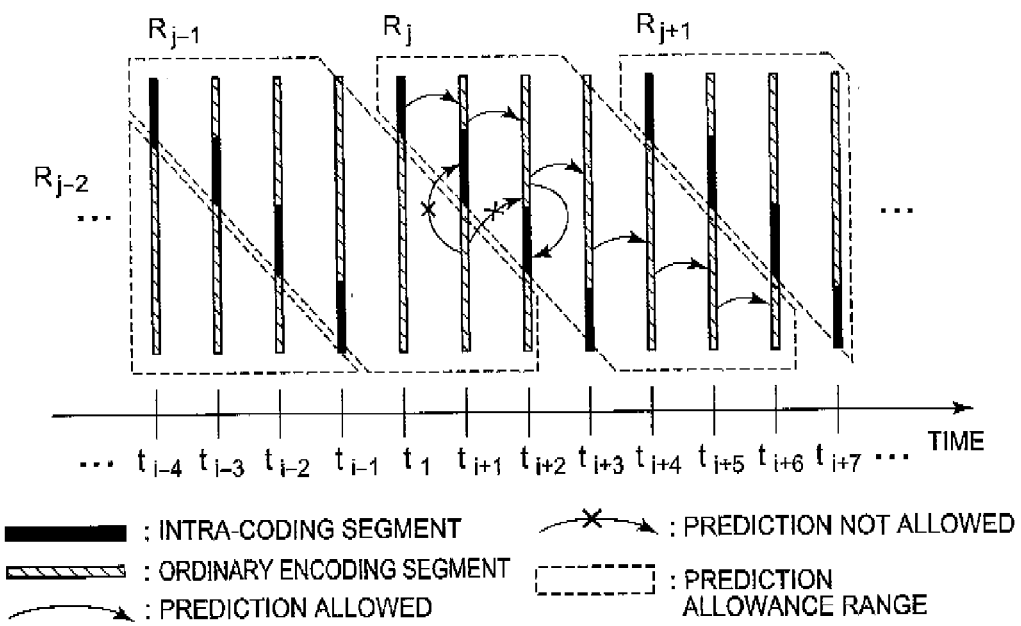
FIG. 11 is an explanatory view to describe slice refresh.
Figure 12:
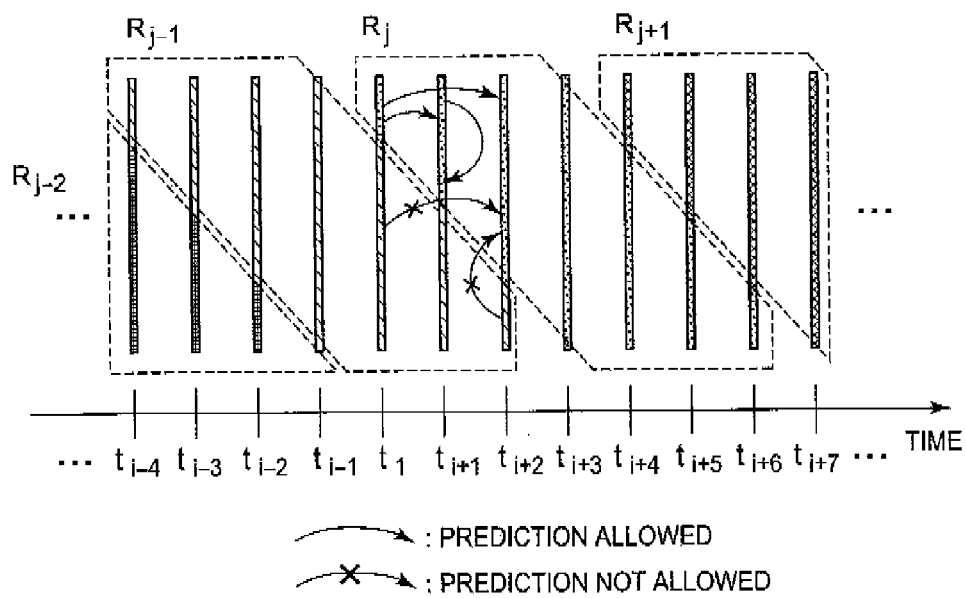
FIG. 12 is an explanatory view to describe a prediction allowance range.
Figure 14:
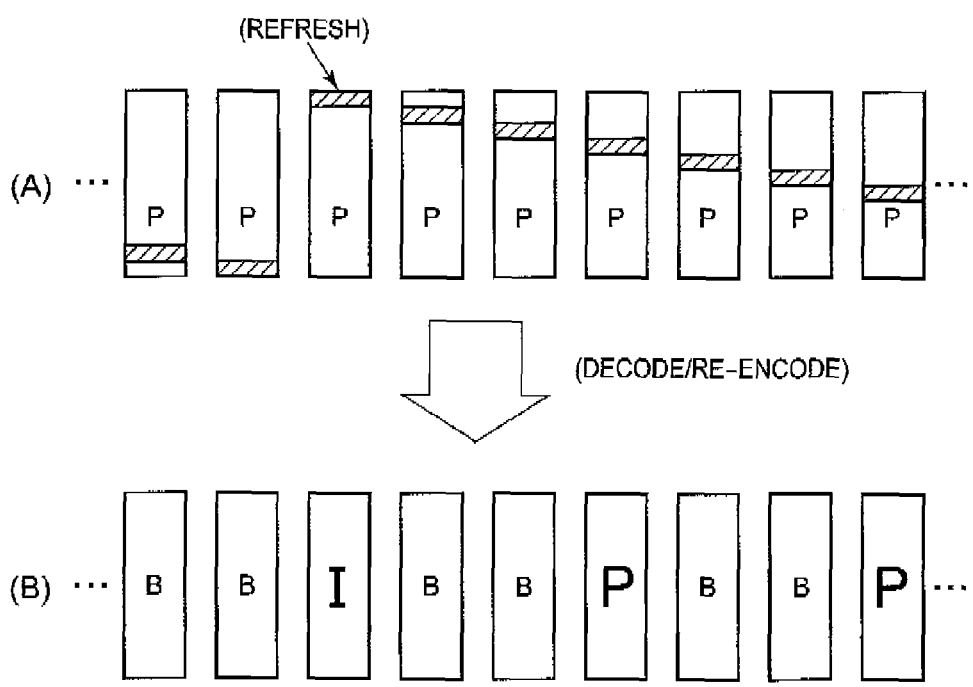
FIG. 14 is an explanatory view showing an example of a relation between a stream of encoded data in a case where gradual refresh is performed and a stream of encoded data re-encoded at a subsequent stage.

Further, in the present exemplary embodiment, gradual refresh (see FIGS. 11 and 14(A)) is used basically. Thus, the intra-frame prediction unit 17 limits a prediction range in a frame to a prediction allowance range. That is, the intra-frame prediction unit 17 is set not to form a predicted value beyond the prediction allowance range. Further, the motion detection unit 19 is set not to generate a motion vector beyond the prediction allowance range. As a result, the adaptive prediction selection unit 20 can exclude predicted values by the intra-frame prediction unit 17 beyond the prediction allowance range and predicted values by the inter-frame prediction unit 18 beyond the prediction allowance range.

Note that instead of setting the motion detection unit 19 not to generate a motion vector beyond the prediction allowance range, the adaptive prediction selection unit 20 may be configured to select the output of the intra-frame prediction unit 17 when detecting a motion vector beyond the prediction allowance range being output from the motion detection unit 19.

Note that the control except the refresh is the same as the control in the first exemplary embodiment.

As has been described above, in the above exemplary embodiment, when the re-encoding picture type judgment unit 10 judges that a picture is to be taken as a reference picture in a subsequent re-encoding process, control is performed so that a quantization step for quantization by the quantization part is smaller than a case where it is judged that the picture is to be taken as a non-reference picture, thereby making it possible to improve encoding efficiency in a whole system.

Figure 10:
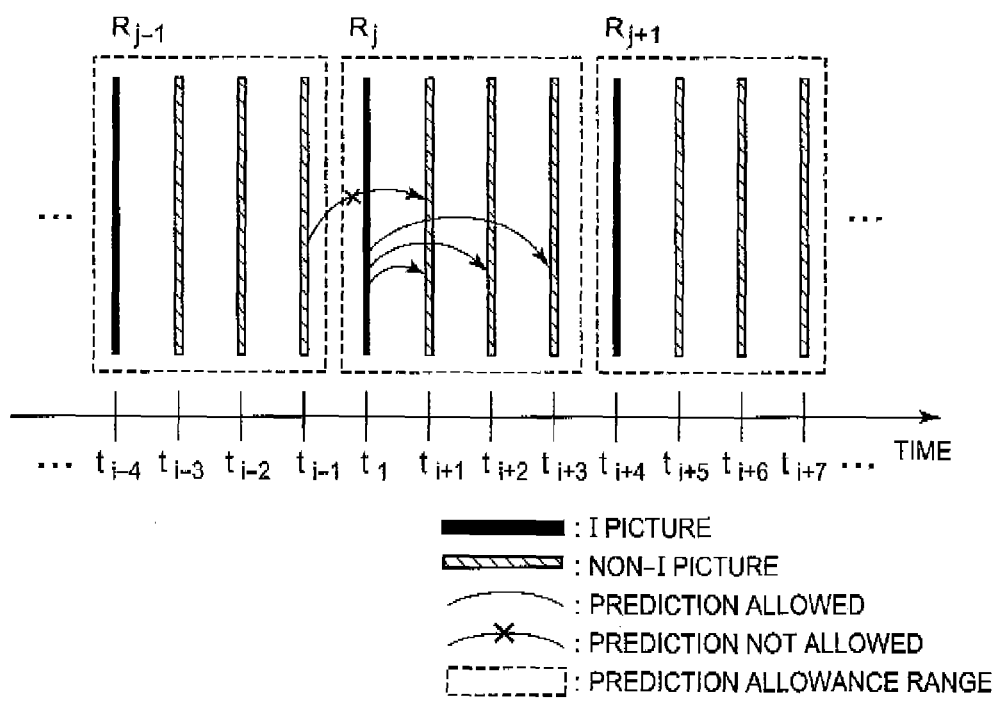
FIG. 10 is an explanatory view showing a state where a screen is refreshed by an I picture.

Further, as a comparative example, encoding efficiency was measured with the use of an encoding device which performs gradual refresh shown in FIG. 11 by use of an encoding system based on H.264/MPEG-4 AVC, and a subsequent re-encoding device which performs a process of refreshing a whole image (one screen) by an I picture as shown in FIG. 10 by use of an encoding system based on MPEG-2. Further, encoding efficiency was measured with the use of the encoding device of the present exemplary embodiment and a subsequent re-encoding device which performs a process of refreshing a whole image (one screen) by an I picture as shown in FIG. 10 by use of an encoding system based on MPEG-2. In the case where the encoding device of the present exemplary embodiment was used, the encoding efficiency was improved by about 10% as compared with the comparative example.

Note that each of the above exemplary embodiments takes as an example a case where the encoding device is applied to the video data transmission system in which encoded data of video is transmitted to reception equipment which audiences have from a video acquisition spot via relay stations and broadcasting stations, but the applications of the encoding device according to the present invention are not limited to such a system. For example, the present invention can be applied to an encoding device used in a bidirectional communication.

Figure 6:
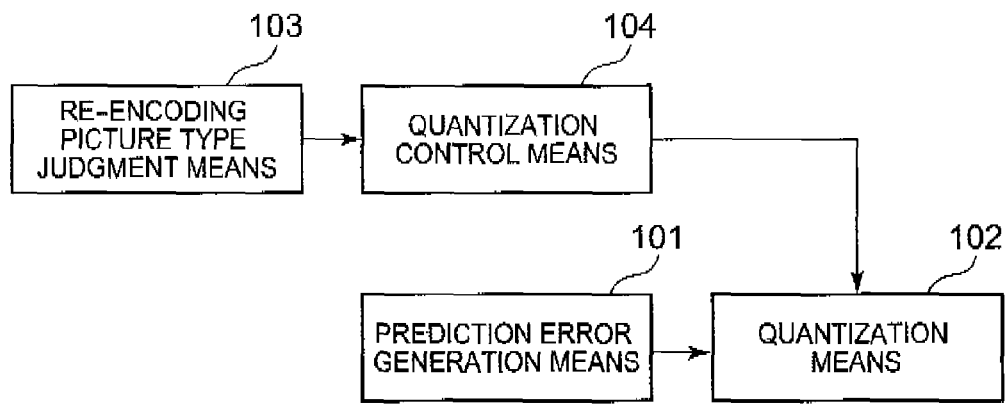
FIG. 6 is a block diagram showing main blocks in an encoding device according to the present invention.

FIG. 6 is a block diagram showing main blocks in the encoding device according to the present invention. As shown in FIG. 6, the encoding device includes: prediction error generation means 101 (corresponding to the subtracter 11, the adaptive prediction selection unit 20, the intra-frame prediction unit 17, the inter-frame prediction unit 18, the motion detection unit 19, and the frequency conversion part in the frequency conversion/quantization unit 13 in the example shown in FIG. 5) for generating a prediction error signal from image data and a predicted value generated by an inter-prediction part or an intra-prediction part; quantization means 102 (corresponding to the quantization part in the frequency conversion/quantization unit 13 in the example shown in FIG. 5) for quantizing the prediction error signal generated by the prediction error generation means 101; and re-encoding picture type judgment means 103 (corresponding to the re-encoding picture type judgment unit 10 in the example shown in FIG. 5) for judging whether a picture is to be taken as a reference picture or not in a subsequent re-encoding process, wherein the prediction error generation means 101 generates the prediction error signal so that only a picture to be a reference picture is formed when an encoded picture is formed, and the encoding device further includes quantization control means 104 (corresponding to the quantization control unit 12 in the example shown in FIG. 5) for, when the re-encoding picture type judgment means 103 judges that the picture is to be taken as a reference picture in the subsequent re-encoding process, controlling so that a quantization step for quantization by the quantization means 102 is smaller than a case where the picture is judged to be taken as a non-reference picture.

Figure 7:
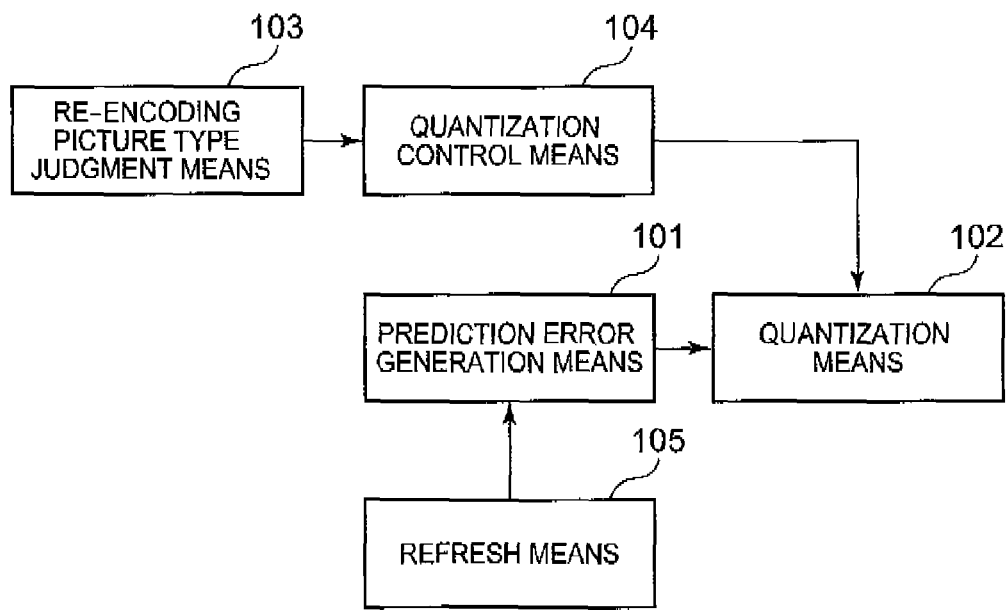
FIG. 7 is a block diagram showing main blocks in an encoding device according to the present invention.
Figure 8:
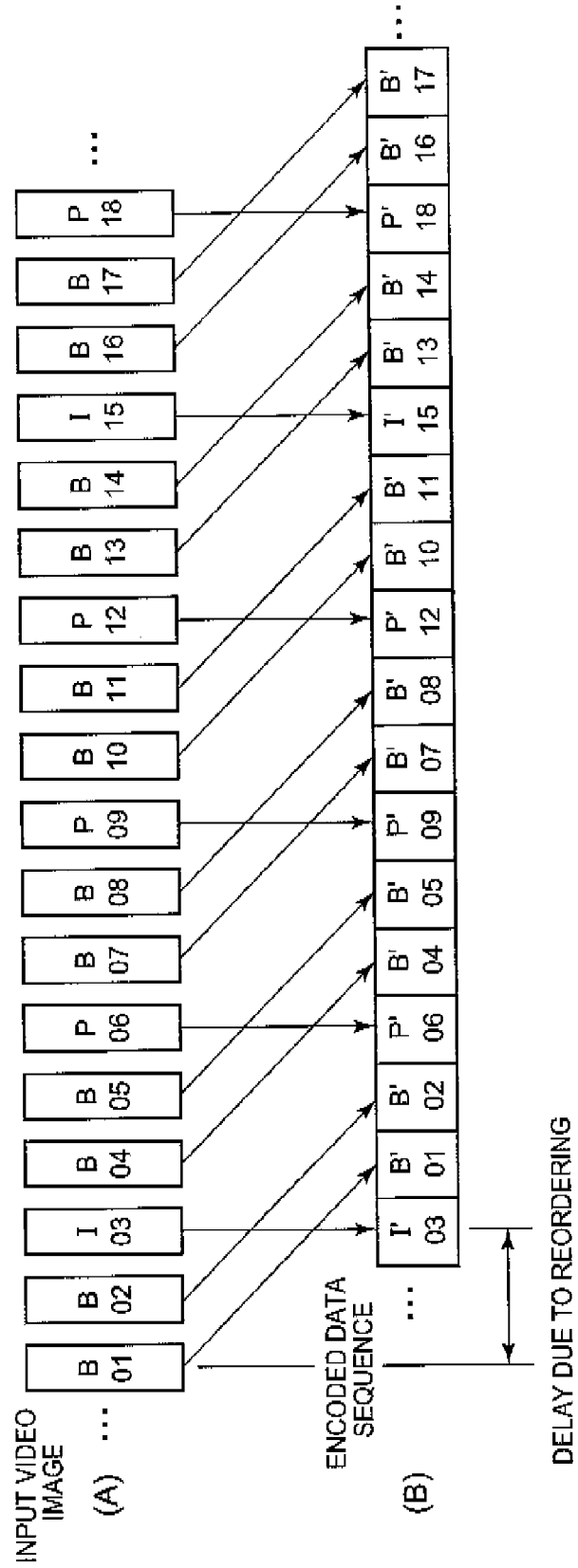
FIG. 8 is an explanatory view to describe reordering of pictures.
Figure 9:
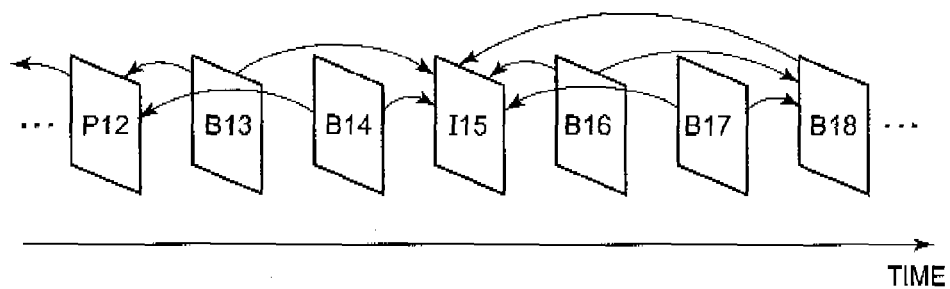
FIG. 9 is an explanatory view showing a reference relationship between pictures.

As shown in FIG. 7, the encoding device may be configured such that the encoding device includes refreshed refresh means 105 (implemented by the refresh control unit 22, the intra-frame prediction unit 17, the inter-frame prediction unit 18, and the adaptive prediction selection unit 20, in the example shown in FIG. 5) for refreshing such that a partial area in a picture is assumed as a refreshed unit area in which encoding by intra-coding is performed and the refreshed unit area is moved on a picture-by-picture basis within a prediction allowance range constituted by a plurality of pictures, and the prediction error generation means 101 excludes those predicted values by the intra-prediction part and the inter-prediction part which are beyond the prediction allowance range to generate the prediction error signal.

Further, the encoding device may be configured such that the encoding device includes refresh means 105 for refreshing such that a partial area in a picture is assumed as a refreshed unit area in which encoding by inter-coding is performed and the refreshed unit area is moved on a picture-by-picture basis within a prediction allowance range constituted by a plurality of pictures, and the prediction error generation means 101 excludes those predicted values by the intra-prediction part and the inter-prediction part which are beyond the prediction allowance range to generate the prediction error signal.

The prediction error generation means 101 may be configured to generate the prediction error signal from a predicted value using only one-direction prediction, in a case of using a predicted value generated by the inter-prediction part to form a picture to be a reference picture. In such a configuration, degree of increase and decrease in a coding amount per picture is restrained, thereby making it possible to decrease an amount of delay.

The prediction error generation means 101 may be configured to generate the prediction error signal only by use of a predicted value generated by the intra-prediction part to form a picture to be a reference picture. In such a configuration, degree of increase and decrease in a coding amount per picture is restrained, thereby making it possible to decrease an amount of delay.

The prediction error generation means 101 may be configured to always use a predicted value generated by the intra-prediction part to generate the prediction error signal. That is, the encoding device may be configured to output all pictures as intra-coded pictures.

The present invention has been described with reference to the exemplary embodiments and examples as described above, but the present invention is not limited to the exemplary embodiments and the examples. Various changes that a person skilled in the art can understand can be made for the configuration and details of the present invention within a scope of the present invention.

This application claims priority based on Japanese Patent Application No. 2009-203420 filed on Sep. 3, 2009, the entire contents of which are hereby incorporated by reference.

REFERENCE SIGNS LIST

10 Re-encoding picture type judgment unit
11 Subtracter
12 Quantization control unit
13 Frequency conversion/quantization unit
14 Inverse quantization/inverse frequency conversion unit
15 Adder
16 Frame memory
17 Intra-frame prediction unit
18 Inter-frame prediction unit 19 Motion detection unit
20 Adaptive prediction selection unit
21 Variable length coding unit
22 Refresh control unit
31, 41 Camera
32 Communication network
33 Local broadcast station
34 Transmission path
35 Key station
42 Microwave link
43 FPU
44 Transmission path
51, 52, 61, 62 Reception equipment
101 Prediction error generation means
102 Quantization means
103 Re-encoding picture type judgment means
104 Quantization control means
105 Refresh means

The invention claimed is:

1. A video encoding device for inter-coding or intra-coding image data in an input video image to form an encoded picture, the video encoding device comprising:
a hardware including a processor;
a prediction error generation unit, implemented by the processor, which generates a prediction error signal from image data and a predicted value generated by an inter-prediction part or an intra-prediction part;
a quantization unit, implemented by the processor, which quantizes the prediction error signal generated by the prediction error generation unit;
a re-encoding picture type judgment unit, implemented by the processor, which judges whether a picture is to be taken as a reference picture or not in a subsequent re-encoding process; and
a refresh unit, implemented by the processor, which refreshes such that a partial area in a picture is assumed as a refreshed unit area in which encoding by intra-coding is performed and the refreshed unit area is moved on a picture-by-picture basis within a prediction allowance range constituted by a plurality of pictures,
wherein the prediction error generation unit generates the prediction error signal so that only a picture to be a reference picture is formed when the encoded picture is formed, and the encoding device further comprises a quantization control unit, implemented by the processor, which, when the re-encoding picture type judgment unit judges that the picture is to be taken as a reference picture in the subsequent re-encoding process, controls so that a quantization step for quantization by the quantization unit is smaller than a case where the picture is judged to be taken as a non-reference picture,
wherein the prediction error generation unit excludes those predicted values by the intra-prediction part and the inter-prediction part which are beyond the prediction allowance range to generate the prediction error signal.

2. The video encoding device according to claim 1, wherein the refresh unit refreshes such that a partial area in a picture is assumed as a refreshed unit area in which encoding by inter-coding is performed and the refreshed unit area is moved on a picture-by-picture basis within a prediction allowance range constituted by a plurality of pictures.

3. The video encoding device according to claim 1, wherein: the prediction error generation unit generates the prediction error signal from a predicted value using only one-direction prediction, in a case of using a predicted value generated by the inter-prediction part to form a picture to be a reference picture.

4. The video encoding device according to claim 1, wherein: the prediction error generation unit generates the prediction error signal only by use of a predicted value generated by the intra-prediction part to form a picture to be a reference picture.

5. The video encoding device according to claim 1, wherein: the prediction error generation unit always uses a predicted value generated by the intra-prediction part to generate the prediction error signal.

6. A video encoding device for intra-coding image data in an input video image to form an encoded picture, the video encoding device comprising:
a hardware including a processor;
a prediction error generation unit, implemented by the processor, which generates a prediction error signal from image data and a predicted value generated by an intra-prediction part;
a quantization unit, implemented by the processor, which quantizes the prediction error signal generated by the prediction error generation unit;
a re-encoding picture type judgment unit, implemented by the processor, which judges whether a picture is to be taken as a reference picture or not in a subsequent re-encoding process;
a quantization control unit, implemented by the processor, which, when the re-encoding picture type judgment unit judges that the picture is to be taken as a reference picture in the subsequent re-encoding process, controls so that a quantization step for quantization by the quantization unit is smaller than a case where the picture is judged to be taken as a non-reference picture; and
a refresh unit, implemented by the processor, which refreshes such that a partial area in a picture is assumed as a refreshed unit area and the refreshed unit area is moved on a picture-by-picture basis within a prediction allowance range constituted by a plurality of pictures, wherein the prediction error generation unit excludes that predicted value by the intra-prediction part which is beyond the prediction allowance range to generate the prediction error signal.

7. A video encoding method for inter-coding or intra-coding image data in an input video image to form an encoded picture, the video encoding method comprising:
generating a prediction error signal from image data and a predicted value generated by an inter-prediction process or an intra-prediction process;
quantizing the prediction error signal thus generated;
judging whether a picture is to be taken as a reference picture or not in a subsequent re-encoding process;
generating a prediction error signal so that only a picture to be a reference picture is formed when the encoded picture is formed;
controlling, when the picture is judged to be taken as a reference picture in the subsequent re-encoding process, so that a quantization step for quantization is smaller than a case where the picture is judged to be taken as a non-reference picture; and
refreshing such that a partial area in a picture is assumed as a refreshed unit area in which encoding by intra-coding is performed and the refreshed unit area is moved on a picture-by-picture basis within a prediction allowance range constituted by a plurality of pictures, wherein those predicted values by the intra-prediction process and the inter-prediction process which are beyond the prediction allowance range are excluded to generate the prediction error signal.

8. The video encoding method according to claim 7, further comprising: refreshing such that a partial area in a picture is assumed as a refreshed unit area in which encoding by inter-coding is performed and the refreshed unit area is moved on a picture-by-picture basis within a prediction allowance range constituted by a plurality of pictures.

9. A non-transitory computer readable information recording medium storing a video encoding program, causing a computer for inter-coding or intra-coding image data in an input video image to form an encoded picture, performs a method for generating a prediction error signal from image data and a predicted value generated by an inter-prediction process or an intra-prediction process;

quantizing the prediction error signal thus generated;

judging whether a picture is to be taken as a reference picture or not in a subsequent re-encoding process;

generating a prediction error signal so that only a picture to be a reference picture is formed when the encoded picture is formed;

when the picture is judged to be taken as a reference picture in the subsequent re-encoding process, controlling so that a quantization step for quantization is smaller than a case where the picture is judged to be taken as a non-reference picture;

refreshing such that a partial area in a picture is assumed as a refreshed unit area in which encoding by intra-coding is performed and the refreshed unit area is moved on a picture-by-picture basis within a prediction allowance range constituted by a plurality of pictures; and excluding those predicted values by the intra-prediction process and the inter-prediction process which are beyond the prediction allowance range to generate the prediction error signal.

10. The non-transitory computer readable information recording medium according to claim 9, performs a method for refreshing such that a partial area in a picture is assumed as a refreshed unit area in which encoding by inter-coding is performed and the refreshed unit area is moved on a picture-by-picture basis within a prediction allowance range constituted by a plurality of pictures.

11. The video encoding device according to claim 1, in a case where an average quantization level in pictures is represented as Q, a generated coding amount is represented as S, a complexity X, which equals S times Q, the complexity of latest encoding as an I picture is represented as Xi, and the complexity of latest encoding as a P picture is represented as Xp, the quantization control unit determines a time distance between a picture that can be a reference picture and a picture that can be a reference picture subsequently as a distance between reference pictures by comparing Xp/Xi with a predetermined threshold value T.

12. The video encoding method according to claim 7, further comprising: transmitting supplemental information to specify a picture quantized with a small quantization level.

* * * * *